(12) United States Patent
Adelmann

(10) Patent No.: US 7,197,189 B2
(45) Date of Patent: Mar. 27, 2007

(54) SYSTEM AND METHOD HAVING REMOVABLE STORAGE MEDIUM WITH DATA COMPRESSION

(75) Inventor: Todd C. Adelmann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 372 days.

(21) Appl. No.: 10/439,044

(22) Filed: May 15, 2003

(65) Prior Publication Data

US 2004/0228533 A1 Nov. 18, 2004

(51) Int. Cl.
G06K 9/36 (2006.01)
H04N 5/76 (2006.01)

(52) U.S. Cl. ............... 382/239; 348/231.9; 348/231.2

(58) Field of Classification Search ........... 382/232; 348/231.9, 231.2
See application file for complete search history.

(56) References Cited

U.S. PATENT DOCUMENTS

| | | | |
|---|---|---|---|
| 3,943,349 A | 3/1976 | Abel et al. | |
| 5,278,970 A | 1/1994 | Pence | |
| 5,532,740 A * | 7/1996 | Wakui | 348/231.2 |
| 5,535,011 A * | 7/1996 | Yamagami et al. | 386/117 |
| 5,563,655 A * | 10/1996 | Lathrop | 348/231.9 |
| 5,623,701 A | 4/1997 | Bakke et al. | |
| 5,675,789 A * | 10/1997 | Ishii et al. | 707/204 |
| 5,696,926 A | 12/1997 | Culbert et al. | |
| 5,883,588 A | 3/1999 | Okamura | |
| 6,041,374 A * | 3/2000 | Postman et al. | 710/73 |
| 6,188,831 B1 * | 2/2001 | Ichimura | 386/69 |
| 6,199,139 B1 * | 3/2001 | Katayama et al. | 711/106 |
| 6,349,150 B1 | 2/2002 | Jones | |
| 6,501,962 B1 | 12/2002 | Green | |
| 6,583,655 B2 | 6/2003 | Lathrop | |
| 6,970,200 B2 * | 11/2005 | Boll | 348/333.13 |
| 2002/0057852 A1 * | 5/2002 | Durbin et al. | 382/312 |

FOREIGN PATENT DOCUMENTS

| | | |
|---|---|---|
| EP | 0869891 | 10/1998 |
| EP | 1303154 | 4/2003 |
| JP | 09128276 A | 5/1997 |

* cited by examiner

*Primary Examiner*—Wenpeng Chen

(57) ABSTRACT

A method and related system for managing data compression activities within a removable storage device that is receivable by a host device. An exemplary embodiment of the storage device typically includes a storage medium for storing received and compressed data. The storage device further includes a processor for managing data compression functions and writing received and compressed data to the storage medium.

31 Claims, 3 Drawing Sheets

SYSTEM AND METHOD HAVING REMOVABLE STORAGE MEDIUM WITH DATA COMPRESSION

BACKGROUND OF THE INVENTION

Data compression is the process of translating a given amount of data into a smaller representation, so that it may be stored on a medium using a minimum of storage space. Two broad categories of data compression are lossless compression and lossy compression. Numerous compression types or algorithms may be used to achieve either lossless or lossy compression. Lossless compression involves condensing data in a manner such that it can later be extracted to its full form Without any loss of information. Using a lossless compression method, the original data can be reconstructed exactly from the compressed data. Such methods are generally used to compress "discrete" data, such as text, computer-generated data, and various types of image and video information. Lossy compression generally involves a greater degree of compression, however, data compressed in this manner cannot be recovered in its exact original form.

A compression ratio is a general measure of the extent to which a set of data is compressed. For example, an uncompressed image made up of a 100×100 array of pixels may require one byte per pixel, or 10,000 bytes total, for storage. If a compressed version requires only 2,500 bytes, the compression ratio is said to be 4:1, as the original data set was four times larger than the compressed version. Achieving a high compression ratio is often desired when storage space is limited, since more data can be stored on a medium with a given amount of storage space.

Many different types of data compression methods exist. A common compression approach involves replacing a frequently repeated string of multiple characters with a shorter representation, possibly a single character. Upon expansion of lossless-compressed data, the short representation can be replaced with the original representation without any loss of data. A specific example of such a "dictionary-based" compression algorithm is the Huffman Code, in which frequently used elements are assigned a shorter representation than are less frequently used elements. This method is often used for compression of text documents. Run Length Encoding (RLE) consists of the process of searching for repeated runs of a single symbol in an input stream, and replacing them by a single instance of the symbol and a numerical run count (e.g., replacing a string of data reading "AAAAA" with the shorter representation "5A"). Numerous other compression types exist for compressing data.

With the increase in popularity of portable electronic devices, including digital cameras, MP3 players, personal digital assistants (PDAs), and other handheld computers (collectively called "hosts"), the need to store and compress data efficiently has risen. In addition to common onboard memories, such devices often record data to or read data from removable storage media, including miniature storage cards or drives. Generally, a pre-set compression level is chosen prior to taking pictures with a digital camera. When a picture is taken, an image is generally stored on a removable storage device, such as a flash memory card or other insertable media. In general, most digital cameras store images in a Joint Photographic Experts Group (JPEG or JPG) file format, a lossy storage method. If a high-quality image is desired, a higher fidelity level can be selected so that less compression takes place, and little information is discarded when writing the data to the memory. Alternatively, if a lower quality image will suffice, choosing a lower fidelity level, or resolution, will enact a higher compression level, allowing the data to be compressed to a smaller file upon saving. By discarding data concerning image patterns to which the eye is insensitive, there is little visually perceptible loss of information, and the image can be reconstructed substantially as it was recorded in the camera. Image compression is traditionally handled by the host device, the camera in this case, as the image is being written to memory.

Modern PDAs and handheld computers are often used to store or transport many types of data created by personal computer applications, including spreadsheets, word processing files, images, drafting files and music files. Since handheld computers and other portable host devices tend to have limited storage space when compared to a personal computer, it is often beneficial to compress data on the host device, to allow for surplus storage space. Given that many file types often contain information that should not be quantitatively altered or discarded, lossless compression is frequently desired in these cases. Generally, data files may be pre-compressed on a personal computer, then written to the removable storage media. However, it would be beneficial to be able to compress data on the removable storage media itself, whether during saving, on command of the user, or automatically, as the storage media senses it is low on storage space.

Typically, compression activities are managed by the host device. A conventional removable storage device used with multiple host devices would require each host operating system (OS) to understand the compression or encryption type performed by another OS or host software package, limiting the range of host types the compressed data can be read by. Further, compression abilities and settings may vary from host to host, making it even more difficult to one host device to expand data compressed by another host. In addition, when the host device is in charge of compression, managing compression activities may overburden a multi-tasking host, consuming computing power at critical times, often during a period of peak usage. To address the aforementioned issues, it is therefore desired to manage data compression activities within the removable storage device itself, instead of within the host device.

BRIEF SUMMARY

A method and related system for managing data compression activities within a removable storage device that is receivable by a host device. The storage device may be a memory card, miniature magnetic hard drive, or other storage device than can be alternately mated with and removed from a host device. Accordingly, an exemplary embodiment of the removable storage device may include a storage medium and a processor configured to convert received data into compressed data for storage on the storage medium.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms "host device" or, more simply, "host," are used interchangeably herein to denote an electronic device (e.g., a personal computer, PDA, digital camera, MP3 player) capable of receiving a removable data storage medium. The term "removable storage device" is used herein to denote a compact storage medium (e.g., flash memory, optical, magnetic and other storage media) that can be removably interfaced with a host device for data storage.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. In accordance with the present invention, a method and system for managing data compression by a removable storage device is disclosed.

Figure 1:
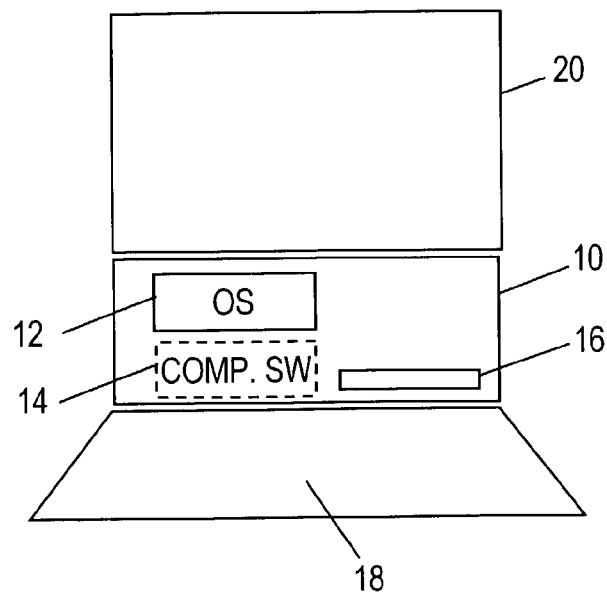
FIG. 1 shows an exemplary host device and removable storage device.
Figure 1:
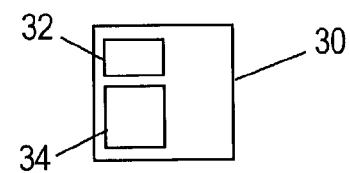

Referring now to FIG. 1, an exemplary representation is shown of a data storage system including a host device 10 and a removable storage device 30. Although represented as a personal computer, it will be understood that the host device 10 may alternatively be a PDA, digital camera, MP3 player, or other type of electronic host device capable of receiving a removable storage device. It will also be understood that, while represented as a solid-state memory card, removable storage device 30 may alternatively be a miniature magnetic hard drive, or other storage device than can be alternately mated with and removed from a host device. Compressing data on the removable storage device 30 may be managed, for example, either by an operating system (OS) 12 of the host device 10, or by a data compression software application 14 running on the host. Removable storage device 30 is generally mated with host 10 at a data transfer interface 16, which may be a card slot.

Compression settings and preferences would be managed by interacting with a input interface 18, which may be a computer keyboard, a PDA touchscreen, a camera button panel or other interface on the host device capable of issuing commands. There may optionally be a graphical display 20 on the host appliance for viewing settings and preferences, such as a monitor screen or LCD display. In the case of a PDA touchscreen, the input interface 18 and graphical display 20 may be the same component. A conventional removable storage device 30 may include a memory 32 and processor 34. Current storage device processors 34 may not have the capability to manage compression, which is then left up to the host device 10.

Figure 2:
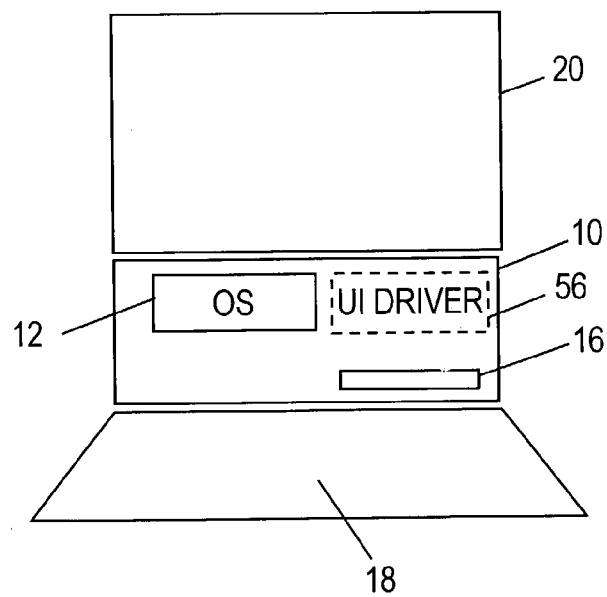
FIG. 2 shows an exemplary host device and removable storage device with data-compression capabilities.
Figure 2:
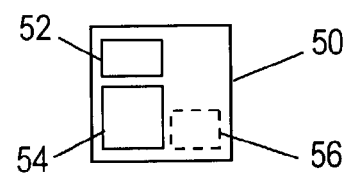

Referring now to FIG. 2, a data storage system in accordance with representative embodiments is shown, including a host device 10 and a removable storage device 50. Although represented as a personal computer and a memory card, it will be understood that the host device 10 and removable storage device 50, respectively, may assume many different forms, as previously described. Removable storage device 50 generally mates with host 10 at a data transfer interface 16.

Compression settings and preferences would be managed by interacting with a input interface 18, which may be a computer keyboard, a touchscreen, a camera button panel or other interface on the host device capable of issuing commands. There may optionally be a graphical display 20 on the host appliance for viewing settings and preferences, such as a monitor screen or LCD display. In the case of a PDA touchscreen, the input interface 18 and graphical display 20 may be the same component.

A removable storage device 50 includes a memory 52 and processor 54, which may be the same component in certain embodiments. Storage device processor 54 manages compression activities within storage device 50, including triggering automatic compression when needed, compressing stored data on command, and initiating compression in-line, as data is written to memory 52. The compression may be performed by processor 54, and alternatively may be performed by a dedicated compression engine. Since compression is handled within the device 50, device 50 can be transferred between hosts without concern as to compression compatibility issues.

Presently, data compression software packages on a host device provide their own graphical user interfaces for display on a monitor, LCD, or touchscreen of a host device. It will be understood that some host devices may be specially designed with hardware (such as buttons) for changing settings and initiating compression on a specific removable storage device, so a graphical user interface may be unnecessary in those cases.

Storage devices may rely on the host device to provide a graphical user interface for selecting preferences and options, and accordingly measures for providing a display on the host for enacting with the storage device may be advantageous. For this reason, storage device 50 may optionally include a user interface generator 56, which may be in the form of one or more software drivers, for uploading to a host device 10. This user interface generator 56 would allow a graphical user interface to be accessed across a wide range of host types, generally displayed on a graphic display 20, for interacting with the settings and preferences of the removable storage device 50. Alternatively, the user interface generator 56 may be loaded onto the host device 10 by transfer from an alternate storage media source, such as a CD-ROM or diskette, or may be downloaded from a remote location, such as an internet file transfer protocol (FTP) site.

Further, certain embodiments may allow user settings and preferences to stay locally within the removable storage device, so that the storage device can be moved from host to host without any need for resetting compression preferences. Moving compression activities to the removable storage device 50 allows processor-intensive compression and expansion activities to be handled by the storage device processor 54, somewhat relieving the computing load on a potentially burdened host device 10. Processor 54 may schedule these activities to take place during "sleep" periods of low usage, rather than during peak periods of usage, when power demands are at their highest.

Processor 54 optionally may be an intelligent processor capable of supporting more than one type of compression, such as lossy image compression, probability-based text character replacement and many other compression algorithms in existence. An intelligent processor in accordance with an exemplary embodiment of the present invention may also be able to intelligently optimally determine which type of compression algorithm is needed when presented with a certain type of data, such as an image file versus a text file. In addition, the processor may be able to determine the optimal compression level for the type of compression algorithm selected, such that data to be compressed according to a lossless algorithm will be compressed to a minimum possible size without loss of data or that data compressed according to a lossy compression will still maintain a reasonable representation of the original received data.

The removable storage device may also allow a user to customize compression parameters for certain algorithms. In one example, data compression may be performed according to an algorithm that samples "windows" of data strings. The larger this sample-size window, the more accurate a representation of the uncompressed data is generally formed. Further, a storage device in accordance with an exemplary embodiment of the present invention may allow a user to adjust this window size, controlling the compression ratio. As other compression algorithms follow other approaches of sampling and representing the original data for compression, other means of customizing the compression ratio or other compression parameters may be employed by a removable storage device.

Figure 3:
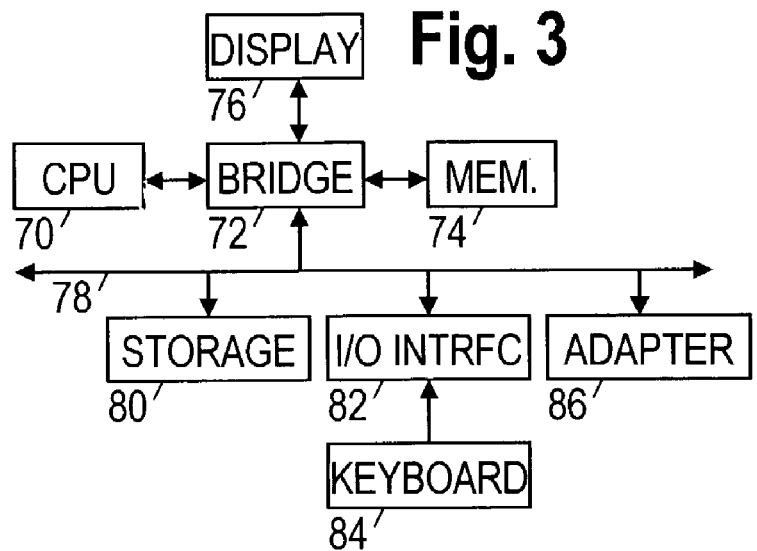
FIG. 3 shows an exemplary computer system with which a removable storage device may be used.

Memory devices may be coupled to digital devices for information storage and retrieval. FIG. 3 shows a computer system, an example of where a removable storage device may be employed. The computer system of FIG. 3 includes a central processing unit (CPU) 70 coupled by a bridge 72 to a system memory 74 and a display 76. CPU 70 is further coupled by bridge 72 to an expansion bus 78. Also coupled to the expansion bus 78 are a storage device 80 and an input/output interface 82. A keyboard 84 may be coupled to the computer via input/output interface 82.

CPU 70 may operate in accordance with software stored in memory 74 and/or storage device 80. Under the direction of the software, the CPU 70 may accept commands from a user via keyboard 84 or some alternative input device, and may display desired information to the operator via display 76 or some alternative output device. CPU 70 may control the operations of other system components to retrieve, transfer, and store data.

Bridge 72 coordinates the flow of data between components. Bridge 72 may provide dedicated, high-bandwidth, point-to-point buses for CPU 70, memory 74, and display 76.

Memory 74 may store software and data for rapid access. Memory 74 may include integrated memory modules, one or more of which may be volatile.

Display 76 may provide data for use by an operator, and is generally analogous to graphical display 20 in FIG. 2. Display 76 may further provide graphics and may include advanced graphics processing capabilities.

Expansion bus 78 may support communications between bridge 72 and multiple other computer components. Bus 78 may couple to removable modular components and/or components integrated onto a circuit board with bridge 72 (e.g., audio cards, network interfaces, data acquisition modules, modems, etc.).

Storage device 80 may store software and data for long-term preservation. Storage device 80 may be portable, or may accept removable media, or may be an installed component, or may be a integrated component on the circuit board. Storage device 80 may be a removable memory device such as a memory card. Alternatively, storage device 80 may be a nonvolatile integrated memory, a magnetic media storage device, an optical media storage device, or some other form of long-term information storage in removable form, and accordingly may be analogous to removable storage device 50.

Input/output interface 82 may support communications with legacy components and devices not requiring a high-bandwidth connection. Input/output interface 82 may further include a real-time clock and may support communications with scan chains for low-level testing of the system.

Keyboard 84 may provide data to interface 82 in response to operator actuation, and is generally analogous to input interface 18 in FIG. 2. Other input devices (e.g., pointing devices, buttons, sensors, etc.) may also be coupled to input/output interface 82 to provide data in response to operator actuation. Output devices (e.g., parallel ports, serial ports, printers, speakers, lights, etc.) may also be coupled to input/output interface 82 to communicate information to the operator.

An adapter 86 may be coupled to expansion bus 78 to couple the expansion bus to removable memory devices such as memory cards, and is generally analogous to data transfer interface 16 in FIG. 2. Alternatively, adapter 86 may be fashioned to couple to a portable digital device for information transfer between the computer system and the portable digital device.

In addition to the above-described computer system, many other general purpose and customized digital devices and systems may beneficially be configured for information transfer between them and memory devices such as memory cards.

Data compression can be triggered in various ways by the representative embodiments. A removable storage device in accordance with the representative embodiments may have the ability to perform compression automatically, upon sensing that the storage device is low on storage space. This feature would be beneficial in a case where a user needs to record an amount of data near or surpassing the remaining storage capability of the removable storage device and is unable to empty or replace the storage device. A predetermined level of data may be selected such that, when the amount of data stored approaches this level, if set to perform automatic compression, the removable storage device will condense the data to a preset level of compression.

Figure 4:
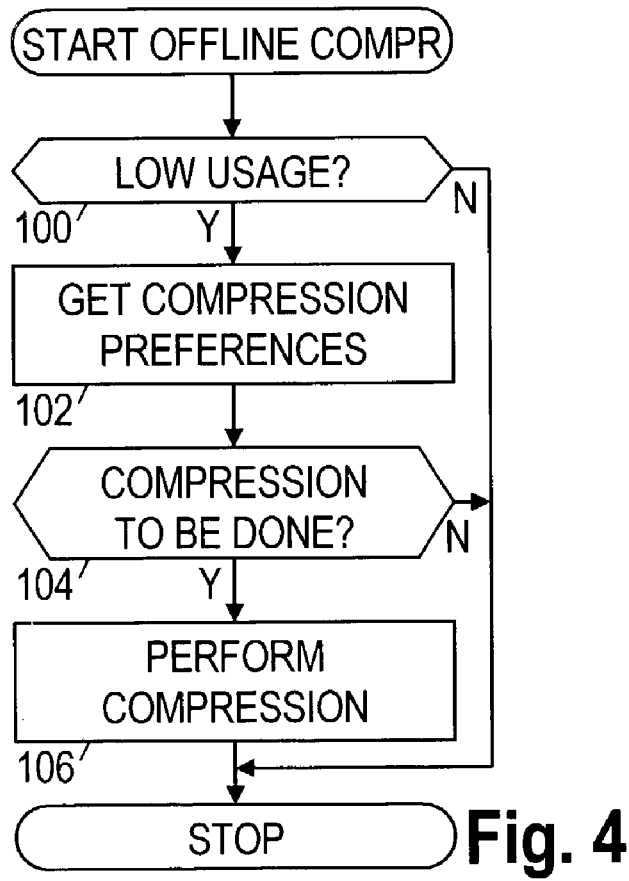
FIG. 4 shows a flowchart of automatic compression operations.

Referring now to FIG. 4, a flowchart of operations representing automatic data compression is shown. In a representative embodiment, this automatic "on-the fly" compression activity would take place during a period of low usage, when the processor of the removable storage device was not burdened with saving data or other tasks. The processor may identify a low-usage or "sleep" period by periodically triggering a usage check, as in block 100. A processor may be pre-programmed to identify a low-usage period as a specific time interval since data was last saved, for example. This low-usage period may optionally be a user-defined setting, such as a time interval selected by the user. Alternatively, the period of low usage may be defined as an instance when a predetermined percentage of the computing resources are available. This method allows a user to efficiently compress data using the compression and data-writing capabilities of the removable storage device, alleviating processing burden on a host device that is in use.

If processor usage is suitably low enough to allow for the compression, processor would access compression preferences, as in block 102, to determine if an automatic compression preference is activated, and also check for the level and/or type of compression to be performed. If it is determined that automatic compression is activated (in block 104), the data will be compressed by the removable storage device, as in block 106. Optionally, a user may be able to define a threshold for automatic compression, such as initiating compression when a specified percentage of storage space is used, or when certain file sizes or a certain number of files have been stored.

Figure 5:
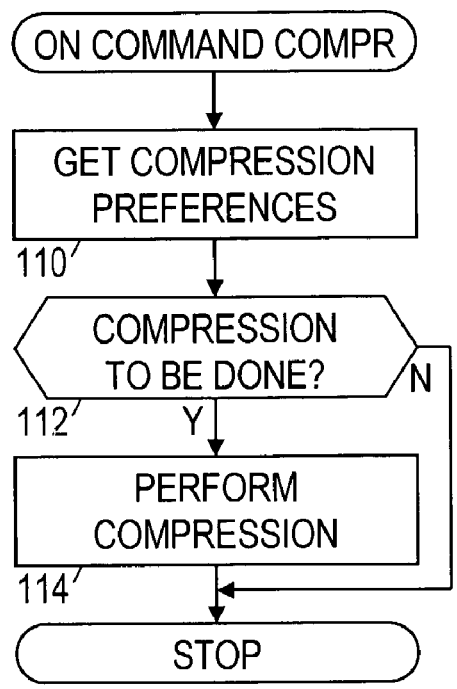
FIG. 5 shows a flowchart of on-command compression operations.

In another method of initiating compression, data compression can also be performed on command of the user. Referring now to FIG. 5, a flowchart is shown of on-command compression. In block 110, compression preferences are accessed to check for the level and/or type of compression to be performed. If the data can be compressed according to the preferences set (in block 112), then compression is performed by the removable storage device, as in block 114.

Figure 6:
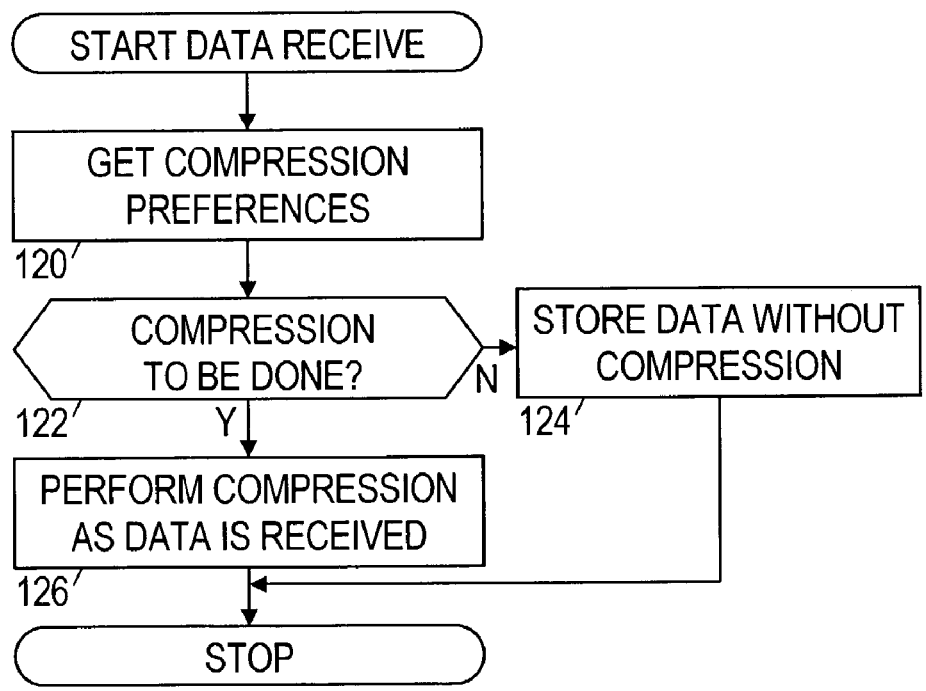
FIG. 6 shows a flowchart of in-line compression operations.

Referring now to FIG. 6, a flowchart is shown of data compression operations performed during saving for "on save," or inline, compression. As data is received, compression preferences are accessed to check for the level and/or type of compression to be performed (in block 120). If compression is enabled, as in block 122, then the data is written to the removable storage device in a compressed form, as in block 126. Accordingly, during inline compression, as in block 126, data compression and saving take place concurrently. If settings have determined that no compression is to be performed, then data is written to the storage device without compression, as in block 124. Optionally, a user may be able to define parameters to enable selective inline compression, such as compressing files larger than a specified size.

In addition, a removable storage device with inline compression capabilities may optionally be able to expand data inline, decompressing the stored data for immediate access on the host device. If this option is enabled for data, retrieving the data for use on the host device would automatically expand the data. In the case of lossy data, the data could be expanded inline to its maximum potential size, or in the case of lossless compression, to its original size. A read-ahead "buffer" may employed during inline expansion to enable faster access to the data.

It will be understood that a removable storage device capable of managing compression activities in accordance with representative embodiments may utilize one or more of the above-mentioned compression methods and may vary in operation order without departing from the spirit of the invention. In addition, since compression preferences and other settings are managed by the removable storage device, a greater versatility in usage of the storage device between various hosts is afforded, avoiding the need to expand the data prior to switching between hosts. It will be also understood that data compression in accordance with the representative embodiments may be performed by the processor of the removable storage device, or alternatively, by another compression engine within the removable storage device without departing from the spirit of the invention.

The optional user interface generator may improve the ease with which a user interacts with the removable storage device. If buttons or other input mechanisms present on the host device cannot adequately support access and modification of compression settings, a user interface driver may be transferred to the host device. Several methods of dispensing this user interface generator to the host device are possible, depending on the capabilities of the host (e.g., internet access for downloading, CD-ROM drive for receiving a compact disk, direct upload from the storage device). Numerous variations and modifications will become apparent to those skilled in the art once the above disclosure is fully appreciated.

What is claimed is:

1. A removable storage medium comprising:
   a memory;
   one or more compression preferences stored on the removable storage device; and
   a processor configured to convert received data into compressed data for storage on the memory;
   wherein, without direction from a host device, the processor automatically selects a compression algorithm and an associated compression level for compressing received data based on the one or more compression preferences stored on the removable storage medium.

2. The removable storage medium of claim 1, further including a dedicated compression engine.

3. The removable storage medium of claim 1, further including a user interface generator for producing a graphical user interface on a host device.

4. The removable storage medium of claim 1, wherein the memory is a nonvolatile integrated memory array.

5. The removable storage medium of claim 1, wherein the processor is configured to perform lossy data compression.

6. The removable storage medium of claim 1, wherein the processor is configured to perform lossless data compression.

7. The removable storage medium of claim 1, wherein the processor is configured to compress received data to a predetermined level, wherein the predetermined level is user-defined.

8. The removable storage medium of claim 1, wherein the processor is configured to compress received data according to a predetermined compression algorithm, wherein the predetermined compression algorithm is user-defined.

9. The removable storage medium of claim 1, wherein the processor is configured to automatically select a compression algorithm and associated compression level suitable for optimally for compressing the received data.

10. The removable storage medium of claim 1, wherein the processor is configured to perform automatic data compression during a period of low usage.

11. The removable storage medium of claim 10, wherein the period of low usage is defined as a predetermined interval since the removable storage medium last wrote data to the memory.

12. The removable storage medium of claim 11, wherein the predetermined interval is user-defined.

13. The removable storage medium of claim 10, wherein the period of low usage is defined as an instance where a predetermined percentage of computing resources are available.

14. The removable storage medium of claim 1, wherein the processor is configured to perform data compression when available storage space falls below a predetermined limit.

15. The removable storage medium of claim 14, wherein the predetermined limit is user-defined.

16. The removable storage medium of claim 1, wherein the processor is configured to perform data compression on received data in the form of a file when the file exceeds a predetermined size.

17. The removable storage medium of claim 16, wherein the predetermined size is user-defined.

18. The removable storage medium of claim 1, wherein the processor is configured to perform data compression on command.

19. The removable storage medium of claim 1, wherein the processor is configured to perform inline data compression, wherein received data is written to the compressed data.

20. The removable storage medium of claim 1, wherein the processor is configured to automatically expand compressed data as the compressed data is accessed by a host device.

21. A system comprising:
   a host device; and
   a removable storage medium configured to convert received data into compressed data for storage;
   wherein the removable storage medium stores one or more compression preferences;
   wherein, without direction from a host device, the removable storage medium automatically selects a compression algorithm and an associated compression level for compressing received data based on the one or more compression preferences stored on the removable storage medium.

22. The system of claim 21, wherein the removable storage medium is configured to perform automatic data compression during a period of low usage.

23. The system of claim 21, wherein the removable storage medium is configured to perform data compression on command.

24. The system of claim 21, wherein the removable storage medium is configured to perform inline data compression, wherein received data is written to the removable storage medium as compressed data.

25. The system of claim 21, wherein the removable storage medium is configured to automatically select a compression algorithm and associated compression level suitable for optimally compressing the received data.

26. A method of transferring data between host devices using a removable storage medium, comprising:
   storing one or more compression preferences on the removable storage medium;
   a first host device providing data to the removable storage medium, wherein the removable storage medium is configured for compressing and storing data in a nonvolatile memory; and
   a second host requesting data from the removable storage medium, wherein the removable storage medium is configured for expanding data from the nonvolatile memory;
   wherein, without direction from a host device, the removable storage medium automatically selects a compression algorithm and an associated compression level suitable to compress received data based on the one or more compression preferences stored on the removable storage medium.

27. The method of claim 26, wherein the removable storage medium is configured to perform automatic data compression during a period of low usage.

28. The method of claim 26, wherein the removable storage medium is configured to perform data compression on command.

29. The method of claim 26, wherein the removable storage medium is configured to perform inline data compression, wherein received data is written to the nonvolatile memory as compressed data.

30. The method of claim 26, wherein the removable storage medium is configured to automatically expand compressed data as the compressed data is accessed by the second host device.

31. The method of claim 26, wherein the removable storage medium is configured to automatically selects a compression algorithm and an associated compression level that is suitable for optimally compressing the received data.

* * * * *

UNITED STATES PATENT AND TRADEMARK OFFICE
CERTIFICATE OF CORRECTION

| | | |
|---|---|---|
| PATENT NO. | : 7,197,189 B2 | Page 1 of 1 |
| APPLICATION NO. | : 10/439044 | |
| DATED | : March 27, 2007 | |
| INVENTOR(S) | : Todd C. Adelmann | |

It is certified that error appears in the above-identified patent and that said Letters Patent is hereby corrected as shown below:

In column 9, line 18, in Claim 19, after "to the" insert -- memory as --.

Signed and Sealed this

Seventeenth Day of February, 2009

JOHN DOLL
*Acting Director of the United States Patent and Trademark Office*